US008717572B2

(12) United States Patent
Faase et al.

(10) Patent No.: US 8,717,572 B2
(45) Date of Patent: May 6, 2014

(54) SPECTROPHOTOMETER

(75) Inventors: Kenneth J. Faase, Corvallis, OR (US);
James R. Przybyla, Corvallis, OR (US);
Melinda M. Valencia, Corvallis, OR (US); Jim Weaver, Manassas, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1363 days.

(21) Appl. No.: 11/811,692

(22) Filed: Jun. 12, 2007

(65) Prior Publication Data

US 2008/0309921 A1    Dec. 18, 2008

(51) Int. Cl.
*G01B 9/02*    (2006.01)

(52) U.S. Cl.
USPC ........................................................ 356/454

(58) Field of Classification Search
USPC ................... 356/454, 519, 320, 319; 250/226
See application file for complete search history.

(56) References Cited

U.S. PATENT DOCUMENTS

| | | | |
|---|---|---|---|
| 4,675,525 A * | 6/1987 | Amingual et al. | 250/338.1 |
| 5,311,485 A | 5/1994 | Kuzmenko et al. | |
| 6,985,216 B2 | 1/2006 | Treado et al. | |
| 2004/0218187 A1 * | 11/2004 | Cole | 356/454 |
| 2006/0007437 A1 | 1/2006 | Treado et al. | |
| 2006/0275944 A1 * | 12/2006 | Hyun | 438/70 |
| 2007/0090275 A1 * | 4/2007 | Toyoda et al. | 250/208.1 |

FOREIGN PATENT DOCUMENTS

| | | |
|---|---|---|
| DE | 102005027023 | 12/2006 |
| JP | 10284806 | 10/1998 |
| JP | 06003890 | 1/2006 |

* cited by examiner

*Primary Examiner* — Tarifur Chowdhury
*Assistant Examiner* — Jonathon Cook

(57) ABSTRACT

A spectrophotometer includes a plurality of sensor elements arranged together, each sensor element including a filter; a light sensor optically coupled with an output of the filter; and a barrier that surrounds the filter and light sensor and a space between the filter and light sensor. For each sensor element, the barrier blocks light that has not passed through the filter from reaching the light sensor including such that light from one sensor element is not detected by another of the sensor elements.

10 Claims, 5 Drawing Sheets

SPECTROPHOTOMETER

BACKGROUND

The detection of light is used in a wide variety of applications. For example, light beams and corresponding light detectors are used to detect presence or encode motion. When light is incident on a light detector or photo-detector, it causes the detector to output an electronic signal that indicates that the beam of light has been received and may indicate the intensity or strength of the light received.

In some applications, it is desirable to detect light of a specific color or wavelength to assist in identifying components of a substance. Spectroscopy is also frequently used in astronomy and remote sensing.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
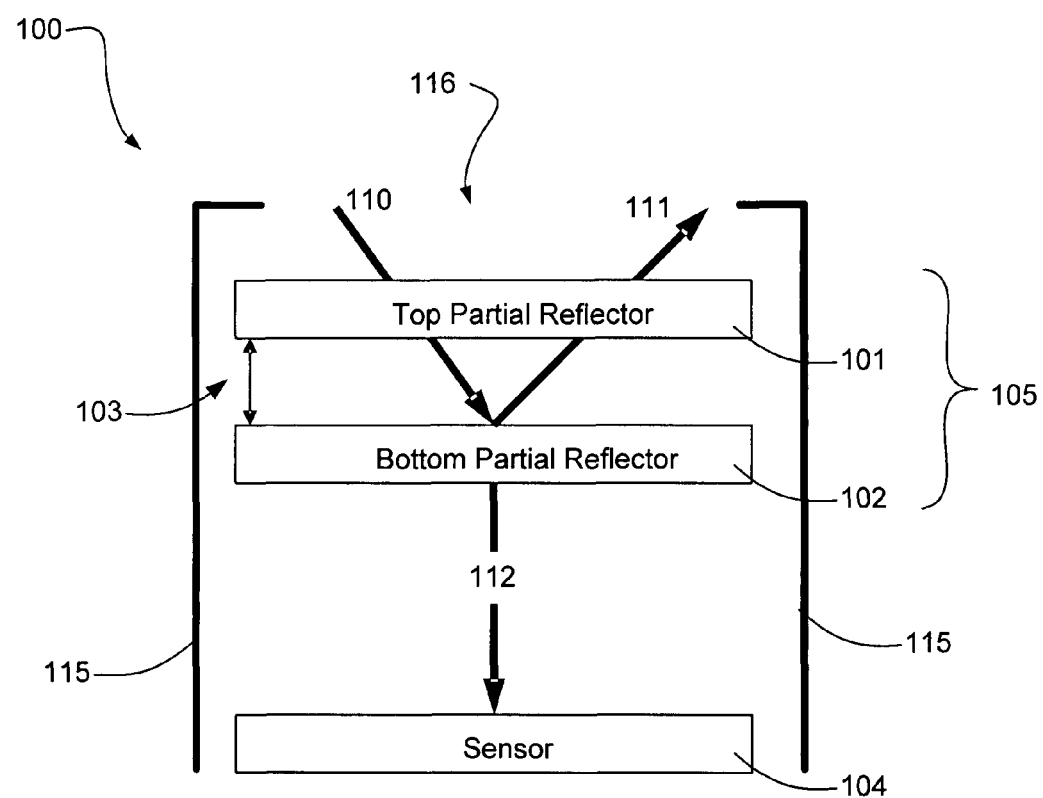
FIG. 1 illustrates an exemplary single element of a spectrophotometer according to principles described herein.

A Fabry-Perot interferometer or etalon can receive a beam of white light and produce from that white light a beam of a particular color or wavelength as desired. The Fabry-Perot interferometer can be tuned, as will be described below, to control the color or wavelength of the light output by that interferometer. In such a case, the interferometer is also referred to as a Fabry-Perot filter or simply a filter. Consequently, Fabry-Perot interferometers and filters are used in a variety of applications including color display devices and color-specific light detection, such as in spectroscopy, photo calorimeters and other applications.

In spectroscopy and related application, such as spectrophotometry, the colored light emerging from a Fabry-Perot filter can then be detected by a light sensor or photo-detector to verify the existence or determine the intensity of that wavelength or color of light in the original beam of multicolor light incident on the spectrophotometer. In some such system, there may be adjacent filter and light sensors, configured to detect the same or different wavelengths. If light waves stray from one such filter/sensor pair to another, the stray light may adversely affect the light detection result of the adjacent sensors.

Consequently, the present specification describes methods and systems of providing and operating a spectrophotometer with reduced sensitivity to light straying between nearby or adjacent Fabry-Perot filters and their corresponding light sensors.

As used herein and in the appended claims, the term "light" or "light beam" will be used to refer broadly to infrared, visible and ultraviolet light. Generally, such a light beam will include light of a number of different wavelengths. The term "white light" will be used to refer to light having wavelength components across the entire visible spectrum. The term "colored light" and similar terms will be used to refer to light having a peak intensity at a particular wavelength.

As used herein and in the appended claims, the term "light sensor" and similar terms will be used to refer broadly to any device that reacts when light is incident thereon so that the presence and/or intensity of that light can be detected. Consequently, the term "light sensor" will include, but is not limited to, photo-detectors, photodiodes, phototransistors, charge coupled devices (CCDs), light-sensitive semiconductors and similar devices.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 illustrates an exemplary single element (100) of a spectrophotometer according to principles described herein. As shown in FIG. 1, the exemplary spectrophotometer element includes a Fabry-Perot filter (105) and a paired light sensor (104). The operation of the filter (105) will now be described.

As shown in FIG. 1, a Fabry-Perot filter (105) includes two partially reflective plates (101, 102) separated by a gap (103). These plates (101, 102) may be half-mirrors, for example.

The ability of the Fabry-Perot filter (105) to output light of particular wavelength or color is a result of interference in the various wavelengths of light that reflect back and forth across the gap (103) between the upper partially reflective plate (101) and the lower partially reflective plate (102). Constructive interference occurs if the reflecting wavelength is in phase. In contrast, destructive interference occurs if the reflecting wavelength is out of phase.

Consequently, by bringing the reflection of a particular wavelength into phase between the upper partially reflective plate (101) and the lower partially reflective plate (102), the light of that wavelength constructive interferes with itself and strengthens in intensity. At the same time, all other wavelengths are destructive interfering and decreasing in intensity. After a nominal time, this situation results essentially in light on only the desired wavelength being transmitted through the filter (105).

Whether the reflections back and forth across the gap (103) of a particular wavelength are in or out of phase depends on the wavelength ($\lambda$) of the light, the angle ($\theta$) the light travels through the filter (105) or etalon, the length (\) thickness of the gap (103) between the partially reflective plates (101, 102) and the refractive index (n) of the material between the reflecting plates (101, 102).

Consequently, by controlling any of these factors, the color or wavelength selected and transmitted by the filter (105) can be controlled. Typically, the filter is tuned to transmit a particular wavelength by adjusting the size of the gap (103) to being the desired wavelength into constructive interference within the filter (105). However, the other factors mentioned above may also be used to tune the filter (105) to the desired wavelength.

As shown in FIG. 1, white or multi-colored light (110) is directed to the spectrophotometer element (100). At least a portion of this light beam (110) will pass through the upper partially reflective plate (101) and enter the filter (105). Some of the incident light beam may be reflected from the filter (105).

Once the light beam (110) has at least partially entered the filter (105), light of the beam (110) will reflect back and forth across the gap (103) between the upper partially reflective plate (101) and the lower partially reflective plate (102). As described above, most of the various wavelengths that make up the incident light beam (110) will destructively interfere during this reflection and loose intensity.

On the other hand, a particular wavelength will reflect back and forth between the upper partially reflective plate (101) and the lower partially reflective plate (102) in phase with itself and will, consequently, experience constructive interference. Light of this particular wavelength will eventually escape, at least partially from the filter (105).

Specifically, some of the colored light of the specific wavelength to which the filter (105) is tuned may pass back through the upper partially reflective plate (101) as shown at (111) in FIG. 1. Additionally, a beam (112) of the colored light selected by the filter (105) will exit through the lower partially reflective plate (102) to the light sensor (104).

The light sensor (104) will detect the light (112) passing through the filter and will produce a corresponding electronic signal that may be routed to a processor or other device that is monitoring the output of the spectrophotometer element (100). As will be appreciated by those skilled in the art, if the incident light beam (110) does not contain light of the wavelength that the filter (105) is configured to constructively reinforce and transmit, the sensor (104) will not receive any light through the filter (105). Consequently, the processor or system monitoring the spectrophotometer element (100) will determine that no light of that specific wavelength was detected.

On the contrary, if the incident light beam (110) does contain light of the wavelength that the filter (105) is configured to constructively reinforce and transmit, the sensor (104) will receive the light beam (112) exiting from the filter (105). Consequently, the processor or system monitoring the spectrophotometer element (100) will determine that light of that specific wavelength was present and detected.

However, as will be appreciated by those of skill in the art, stray light may disrupt the function of the spectrophotometer element (100). For example, if stray light reaches the sensor (104) without passing through the filter (105), the sensor (104) may detect that light regardless of its wavelength and then incorrectly signal the presence or quantity of the selected wavelength to which the filter (105) is tuned.

Additionally stray light could conceivably enter the gap (103) of the filter (105) at such an angle that it is not subject to repeated reflections between the upper partially reflective plate (101) and the lower partially reflective plate (102). Such stray light may pass, at least in part, directly through the lower partially reflective plate (102) to the sensor (104). In such a case, the sensor (104) may again detect that light regardless of its wavelength and then incorrectly signal the presence or quantity of the selected wavelength to which the filter (105) is tuned.

To prevent or minimize any such false signals, a light absorbing barrier (115) is formed around the spectrophotometer element (100). As shown in FIG. 1, this barrier will including an opening (116) that allows the incident light (110) to enter the filter (105) properly so that the filter (105) can perform the desired function of isolating a specific wavelength from the light of the incident beam (110). Specifically, the opening (116) is configured to permit light to enter the filter (105) only over a particular range of angles.

However, the barrier (115) will prevent light from reaching the sensor (104) without passing though the filter (105). The barrier will also prevent light from entering the gap (103) between the plates (101, 102) of the filter (105) in a manner that might not initiate the desired reflection between the upper partially reflective plate (101) and the lower partially reflective plate (102) that constructively reinforces the selected wavelength.

The barrier (115) can be made of any of a variety of materials that block and/or absorb light. For example, the barrier (115) can be formed using semiconductor material. An example of the formation of the barrier (115) will be described in detail below in connection with FIG. 4.

In some examples, the barrier (115) may absorb light. In other examples, the barrier (115) may simply block or reflect incident light.

The barrier (115) may surround the paired filter (105) and sensor (104). For example, the barrier (115) may have the shape of a ring or cylinder that rings the paired filter (105) and sensor (104).

Figure 2:
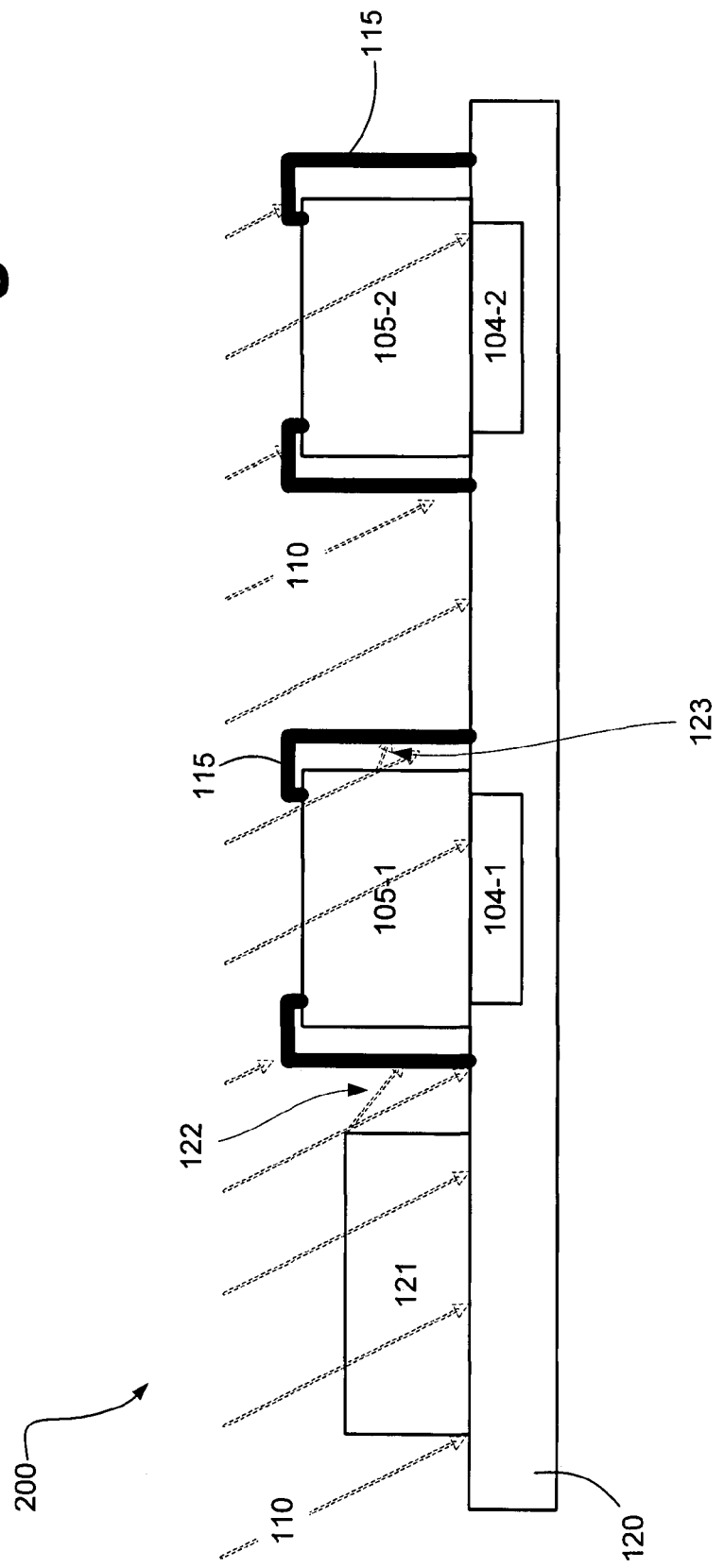
FIG. 2 illustrated an exemplary spectrophotometer according to principles described herein.

FIG. 2 illustrated an exemplary spectrophotometer according to principles described herein. As shown in FIG. 2, the spectrophotometer (200) includes a number of separate elements arranged on a substrate (120). Each such element includes a filter (105) paired with a sensor (104) as described above. In some embodiments, the elements are configured to selectively detect a specific number of different wavelengths within a beam of incident light.

Additionally, as described above, each element is protected with a separate light barrier (115) that prevents or minimizes stray light from being incident on the sensor (104) and creating a false indication of a light wavelength that is not actually present or not present in the indicated quantity. In the illustrated example, each sensor (104) and filter (105) pair are protected by a separate barrier (115).

Other elements of the spectrophotometer (200) are also disposed on the substrate (120). For example, a routing line or connection pad (121) may be adjacent the spectrophotometer elements on the substrate (120). In general, the substrate (120) may support an integrated circuit of which the spectrophotometer (200) is a part and to which the spectrophotometer (200) is electrically or communicatively connected.

Incident light (110) not directly received by the spectrophotometer elements may be reflected or scattered by the various other components on the substrate (120). For example, as shown in FIG. 2, incident light (110) could be scattered (122) by the routing line or connection pad (121).

Absent the barrier (114) protecting the filter (105-1) and sensor (104-1), this scattered light (122) could potentially reach the sensor (104-1) and cause a false detection signal not indicative of the wavelength the filter (105-1) and sensor (104-1) are designed to detect. As described above, the scattered light (122) could potentially reach the sensor (104) by passing around or through a portion of the filter (105-1), without being subject to the wavelength filtering function of the filter (105-1).

Additionally, light sometimes may escape a filter (105-1) without being filtered. An example of such scattering (123) is also shown in FIG. 2).

Again, absent the barrier (115), this scattered light (123) could potentially reach an adjacent sensor element (104-2)

and cause a false detection signal not indicative of the wavelength the filter (105-2) and sensor (104-2) are designed to detect. The separate barrier (115) around the adjacent filter (105-2) and sensor (104-2) will also further prevent the stray light from an adjacent element from negatively affecting the protected spectrophotometer element.

Figure 3:
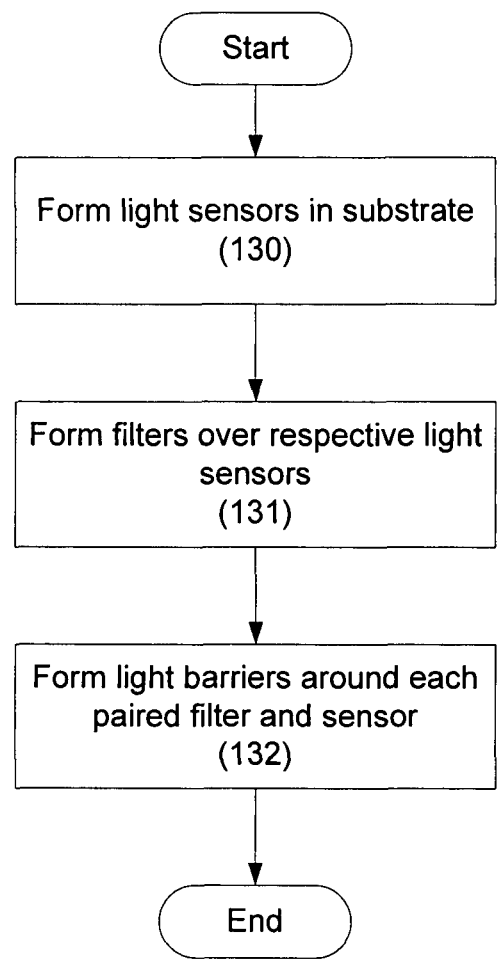
FIG. 3 is a flowchart illustrating an exemplary method of making a spectrophotometer according to principles described herein.

FIG. 3 is a flowchart illustrating an exemplary method of making a spectrophotometer according to principles described herein. As shown in FIG. 3, the method begins with forming (130) the desired number of light sensors in or on a substrate. This may be done with the techniques for patterning and forming integrated circuits on a semiconductor substrate.

Next, the filters are formed (131). The filters are formed over the light sensor and are registered with the light sensors. The filters may be tuned to constructively reinforce and emit the same or different wavelengths depending on the application for which the spectrophotometer is intended.

Lastly, the light barriers are formed (132) around each paired filter and sensor. As described above, these barriers will prevent stray light from causing the sensors to detect light which has not been filtered by the corresponding filter for the particular wavelength that is to be detected.

Figure 4:
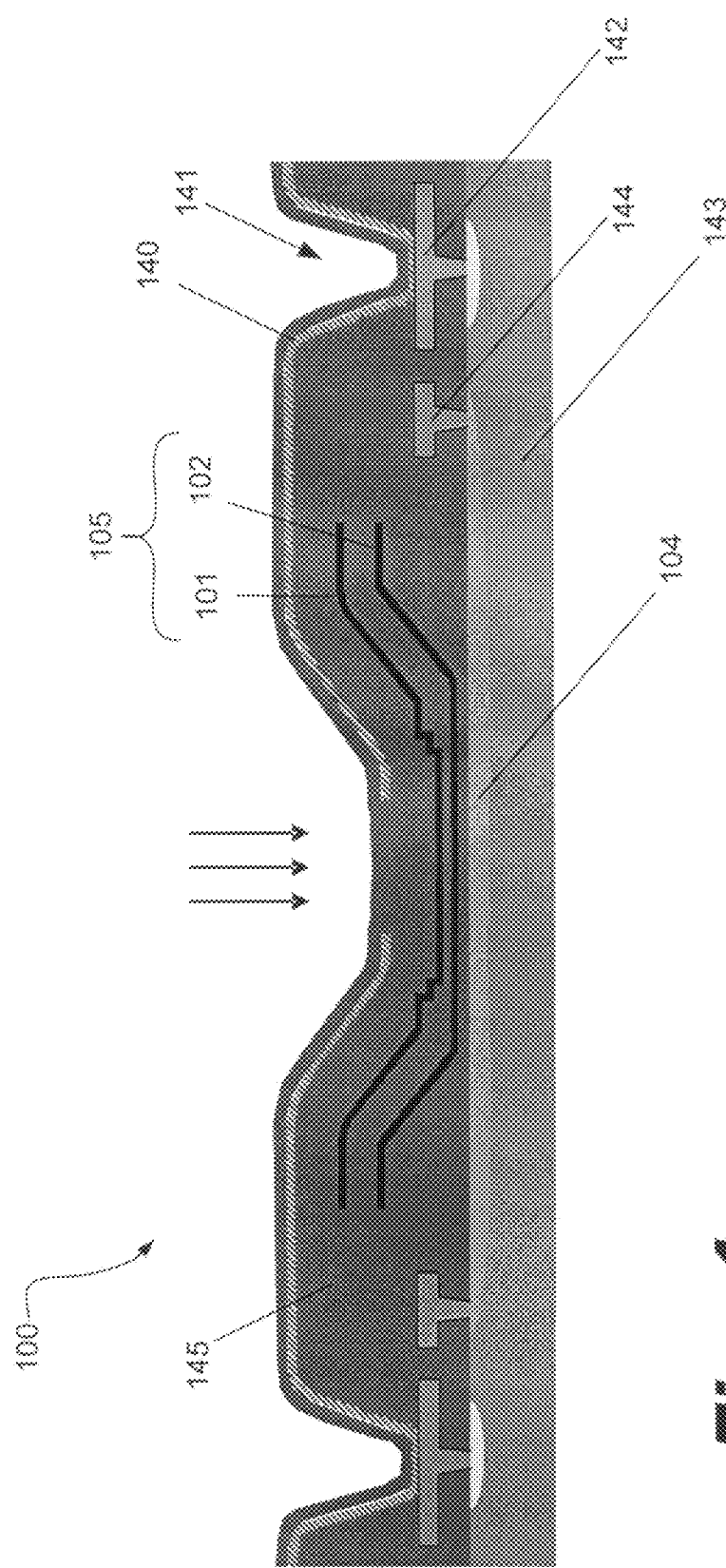
FIG. 4 is another illustration of an exemplary spectrophotometer according to principles described herein.

FIG. 4 is another illustration of an exemplary spectrophotometer according to principles described herein. As shown in FIG. 4, an exemplary spectrophotometer (100) may be formed on a substrate (143). The substrate (143) may be, for example, a silicon wafer. Any number of spectrophotometer units (100) may be formed on the substrate (143).

As described above, a barrier (115, FIG. 1) is provided to protect each spectrophotometer (100) from stray light that does not pass through the filter (105). In this illustrated example, the barrier (115, FIG. 1) is designed to protect the spectrophotometer (100) from stray light from the surface of the substrate (143) up to the surface of the device.

As shown in FIG. 4, a light sensor (104), for example, a photodiode, is formed in the substrate (143). Conductive contacts or plugs (144) are formed, for example, from tungsten, to electrically connect the light sensor (104) to a circuit that operates the spectrophotometer.

As a further part of this circuit, an additional ring of conductive material (142) is formed around each filter (105) of each spectrophotometer (100). This ring (142) is used to route electronic signals within the spectrophotometer (100) and may also be made of tungsten in some examples.

The substrate (143) is covered with a layer (145) of, for example, TetraEthOxySilane (TEOS) or Thermal Oxide (TOX). This layer (145) may be built of multiple deposited layers. Between applications of material for the layer (145), the partially reflective plates (101 and 102) of the filter (105) are successively formed over the sensor (104).

Toward the end of the fabrication process, a trench ring (141) is etched around the spectrophotometer (100). This ring-shaped trench (141) corresponds to and exposes the conductive ring (142) buried under the layer (145). After the trench (141) has been etched, a light barrier layer (140) is deposited over the device. In some embodiments, this barrier layer (140) is a single layer of light absorbing or reflecting material. In other embodiments, the barrier layer (140) may actually be composed of several layers of material, for example, 1000 Angstroms of TaAl, 650 Angstroms of Undoped Silicate Glass (USG), 100 Angstroms of TaAl and 5600 Angstroms of TEOS.

As shown in FIG. 4, the barrier layer (140) is removed from over the filter (105) so that light can enter the filter at the desired angle. Otherwise, the barrier layer (140), which corresponds to the barrier (115, FIG. 1) described above, prevents light from reaching the light sensor (104).

As also shown in FIG. 4, the barrier layer (140) may follow the contour of the trench (141) to the top of the conductive ring (142). In this way, the conductive ring (142) can also function as part of the barrier protecting the spectrophotometer from stray light. For example, the conductive ring (142) serves to captures stray photoelectrons as it serves as part of the barrier around the filter (105). Thus, as shown in FIG. 4, the conductive ring (142) is a barrier to stray light reaching the spectrophotometer (100) between the barrier layer (140) and the substrate (143).

Figure 5:
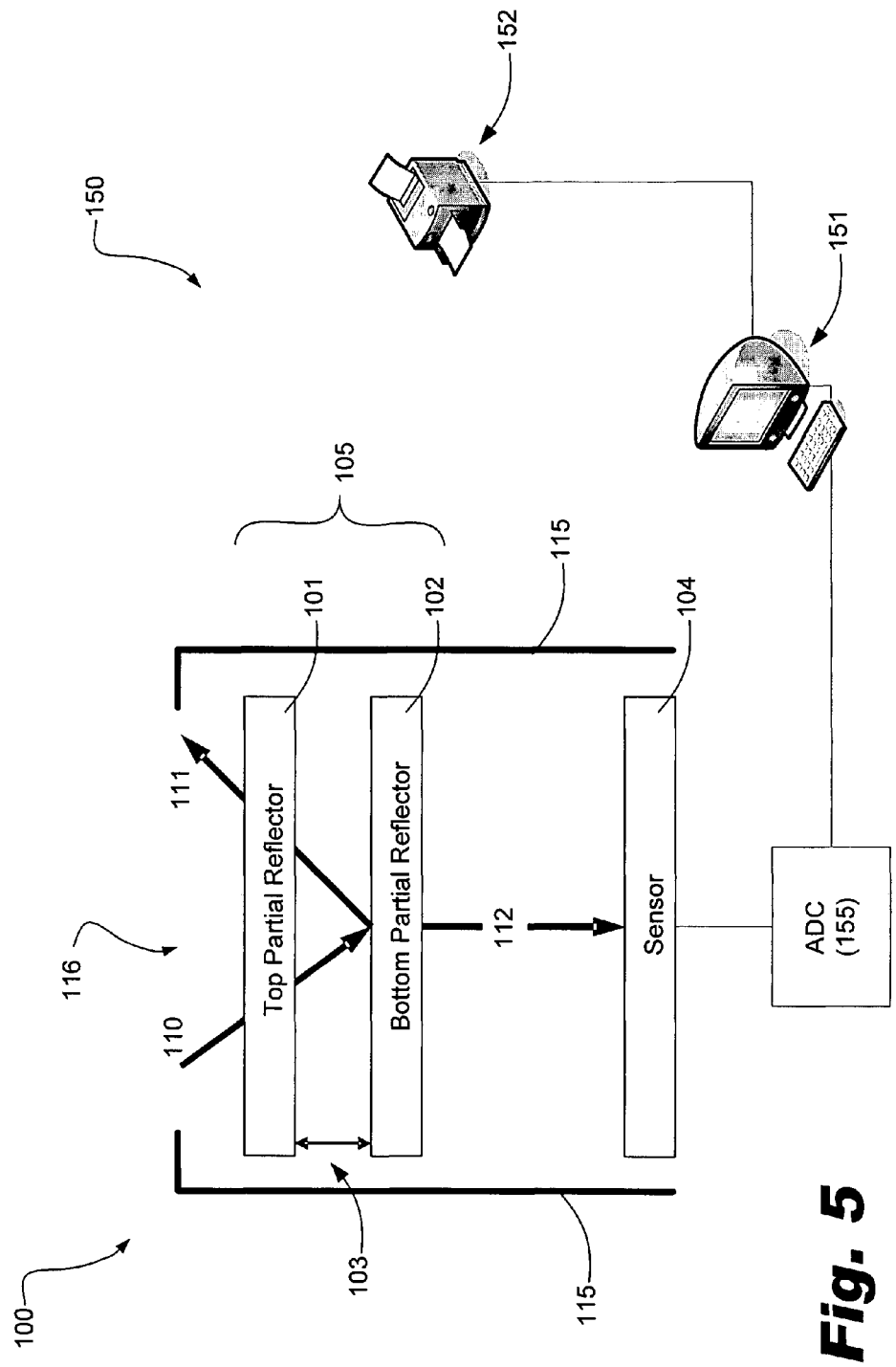
FIG. 5 is an illustration of an exemplary system for a spectrophotometer according to principles described herein.

FIG. 5 is an illustration of an exemplary system for a spectrophotometer according to principles described herein. As shown in FIG. 5, a spectrophotometer (100) unit, such as that illustrated and described above with respect to FIG. 1, may be incorporated into a system (150) for operating any number of spectrophotometer units.

FIG. 5 illustrates only a single spectrophotometer unit (100), but those of skill in the art will appreciate that this represents any number of spectrophotometer units that could be a part of the system (150) shown. As illustrated in FIG. 5, the light sensor (104) of the spectrophotometer unit (100) outputs a signal through an analog-to-digital converter (ADC) (155) to a computer (151).

The computer (151) will include an application that receives and interprets the output from all the spectrophotometer units (e.g., 100) in the system (150). For example, the computer (151) will be programmed with data that specifies the wavelength each spectrophotometer unit (100) in the system (150) is tuned to detect. Based on this, the computer (151) will determine based on the output signals from the spectrophotometer units (e.g., 100) whether that wavelength or wavelengths were detected at the location of the corresponding spectrophotometer unit. In this way, the computer (151) can determine and display data representing the wavelength or wavelengths of light received by the spectrophotometer units.

In some embodiments, the system (150) may also include a printer (152). The computer (151) may display the spectrophotometer data on the attached display device or may output the data to the printer (152).

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A spectrophotometer comprising
    a plurality of sensor elements arranged together, each said sensor element comprising:
    a filter configured to pass a particular color of light;
    a light sensor optically coupled with an output of said filter; and
    a barrier that surrounds said filter and light sensor and a space between said filter and light sensor, wherein said barrier comprises an opening optically coupled with said filter and configured to admit light to said filter at only a particular range of angles such that light arriving outside said range of angles is blocked from said filter and said light sensor by said barrier,
    in which, for each said sensor element, said barrier blocks light that has not passed through said filter from reaching said light sensor including such that light from one said sensor element is not detected by another of said sensor elements;

wherein said barrier comprises an electrically conductive ring that completely surrounds said filter and light sensor.

2. The element of claim 1, wherein said conductive ring captures stray photoelectrons.

3. A method for a spectrophotometer having a filter and a light sensor spaced apart from said filter and optically coupled with an output of said filter, the method comprising:
    etching a trench ring around said filter and light sensor in a layer of material deposited over said spectrophotometer; and
    forming a light barrier for blocking light that has not passed through said filter from reaching said light sensor, said forming said light barrier comprising depositing a light reflecting or absorbing material in said trench ring.

4. The method of claim 3, wherein blocking light that has not passed through said filter comprises surrounding said filter and light sensor with an opaque light barrier.

5. The method of claim 4, wherein blocking light that has not passed through said filter further comprises, with an opening in the light barrier, permitting incident light only within a particular range of angles to reach a filter of a corresponding spectrophotometer element.

6. The method of claim 3, further comprising forming an electrically conductive ring around said filter and light sensor;
    in which said trench ring exposes said conductive ring such that said ring serves as part of said light barrier.

7. A spectrophotometer comprising a plurality of sensor elements arranged together, each said sensor element comprising:
    a filter;
    a light sensor optically coupled with an output of said filter; and
    a cylindrical barrier that surrounds said filter and light sensor and a space between said filter and light sensor, said cylindrical barrier comprising an opening in a top thereof with a diameter smaller than that of said cylindrical barrier, said opening configured to admit light to said filter at only a particular range of angles;
    in which, for each said sensor element, said barrier blocks light that has not passed through said filter from reaching said light sensor including such that light from one said sensor element is not detected by another of said sensor elements.

8. The spectrophotometer of claim 7, wherein said barrier comprises an electrically conductive ring that completely surrounds said filter and light sensor.

9. The spectrophotometer of claim 7, in which said barrier comprises semiconductor material.

10. The spectrophotometer of claim 7, in which said barrier completely surrounds said filter and light sensor and said space between said filter and light sensor.

* * * * *